United States Patent Office 3,647,730
Patented Mar. 7, 1972

3,647,730
MASKING COMPOSITIONS
Dennis A. Rott, Bethlehem, Pa., and John P. Smiljanic, Chicago, Ill., assignors to Western Electric Company, Incorporated, New York, N.Y.
No Drawing. Filed Aug. 27, 1969, Ser. No. 853,486
Int. Cl. B44d 1/52; C09d 3/44, 5/20
U.S. Cl. 260—23 R
8 Claims

ABSTRACT OF THE DISCLOSURE

Masking compositions for strip plating of metal stock and for anodizing of metallic surfaces are composed of high-melting microcrystalline wax and organophilic kaolinite blended with ethylene-vinyl acetate copolymer and pentaerythritol abietate. These compositions are flexible, tough and nonblocking, cool rapidly to solids, adhere well to metals, have good dielectric properties and can be cleanly removed from metal surfaces.

BACKGROUND OF THE INVENTION

This invention relates to masking compositions which are useful in protecting selected areas of metal during various surface treatment operations and which are then subsequently removed to expose the surface of the metal which had previously been masked. More particularly, this invention relates to masking compositions comprising microcrystalline waxes and organophilic kaolinite products.

In plating strips of expensive metal (e.g. gold, silver, platinum and palladium) on continuous sheets or strips of metal stock, it is conventional to apply a thin coating of a masking composition or plating-resistant material on the base metal (e.g. iron, steel, copper, or aluminum). This coating material is usually applied to the continuous metal stock by extrusion, by roller or by screen printing. These procedures allow the masking or plating-resistant material to be applied accurately over a predetermined area of the stock, thus exposing a predetermined area of metal for plating with the more expensive metal.

After the plating operation has been completed, the masking or plating-resistant material must be conveniently removed completely from the base metal without leaving any residue thereon. The masking material must have such physical properties that it can be applied evenly and continuously to produce a smooth, uniform, regular film on the base metal. Masking compositions are desirable which are made of inexpensive materials which provide efficient masking of the base metal for use in continuous gold strip-plating and similar operations.

Among the characteristics desired for the masking material are flexibility so that the material is not brittle and does not flake off the stock, relatively high melting or softening point so that it can be used in high-temperature plating operations without blocking or smearing, a hard smooth surface, good adherence to the base metal stock and toughness to withstand shock and abrasion. The properties of the masking composition which are important for these characteristics are viscosity, thixotropy, rapid cooling or hardening rate and hardness.

It is an object of this invention to provide masking compositions which are useful in protecting selected surface areas in the continuous strip-plating of metal stocks.

It is another object of this invention to provide masking compositions for continuous metal plating and anodizing operations which have appropriate viscosity, thixotropy, hardness and cooling rates for ready application, uniform and smooth surface, good adhesion and ready removal without leaving residue or deposits.

It is a further object of this invention to provide masking compositions of microcrystalline wax and organophilic kaolinite which are useful as masking agents for metal plating operations.

These and other objects are apparent from and are achieved in accordance with the following disclosure.

SUMMARY OF THE INVENTION

In accordance with this invention it has been found that a mixture of high-melting microcrystalline wax and organophilic kaolinite, blended with an EVA (ethylene-vinyl acetate) copolymer and pentaerythritol fatty or rosin acid ester, produces a masking compound which meets all requirements. The microcrystalline wax has a high softening point so that blocking and smearing are avoided and the masking compounds can be used in plating baths at elevated temperature. The masking composition has a hard, smooth surface and good adherence to the base metal. It cools rapidly to a hard, tough solid, so that the metal can be coiled, stacked or handled promptly after masking. The kaolinite filler is cheap, very compatible with the organic materials, a good heat-transfer agent, and readily available. The EVA copolymer and the pentaerythritol ester add flexibility and toughness to the composition. The material has relatively low specific gravity as compared to prior art masking materials and this contributes to the economy on a weight basis.

Masking compositions made in accordance with this invention have the following desirable characteristics:

(1) The components are cheap and readily available.
(2) The composition is acid and alkali resistant and impervious to water.
(3) The material does not contain any substances which will plate out or affect the plating or anodizing operation.
(4) The material adheres to the metal stock.
(5) The material is readily removable from the metal stock after plating or anodizing.
(6) The material is flexible at room temperature so that the metal stock can be coiled without the masking material cracking off.
(7) The material is hard enough at plating or anodizing bath temperatures (100–130° F.), so that the masking material is not scraped off the stock by contact brushes.
(8) The material is readily applicable to continuous metal stock by extrusion, by roller and by dry screen application.

DETAILED DESCRIPTION OF INVENTION

In accordance with this invention it has been discovered that masking compositions of desirable properties can be produced by combining microcrystalline wax (30–45% by weight) with organophilic, surface-modified kaolinite (45–68% by weight) to produce compositions which are flexible and tough and which have the desirable properties described above. The microcrystalline waxes are preferably those having high melting points, that is, in the range from 150° to 200° F., although such waxes melting from 130° to 210° F. can be used. Suitable commercial materials include Shellmax 400, melting at 177° F. (Shell Chemical Company, New York, N.Y.) and Bareco Starwax 100, melting at 180° F. (Bareco Division of Petrolite Corporation, Tulsa, Okla.).

The microcrystalline waxes are petroleum waxes of high melting point and hardness. They are mixtures of normal paraffinic, isoparaffinic and naphthenic solid hydrocarbons having average molecular weights from 580 to 700. Preferred are those having needle penetration values from 3 to 20 at 77° F. (A.S.T.M. D–1321).

The organophilic kaolinite is kaolinite which, in fine powder form (0.2 to 10 microns), has been treated with 0.2–2% of an organic polyamine, followed by treatment with 0.5–5% of a fatty acid, washed and dried, the percentages being calculated on the weight of kaolinite. The preferred polyamine is ethylenediamine and the preferred fatty acid is oleic acid. By this procedure, a 25% aqueous suspension of kaolinite (4.5 micron average particle diameter) was treated with 0.6% of ethylenediamine, followed by treatment with 1.5% of oleic acid. The suspension was adjusted to pH 4 with aluminum sulfate and then brought to pH 7 with aqueous ammonia. The suspension was filtered and the filter cake washed with water and dried at 100° C.

Kaolinite when so treated is hydrophobic and organophilic, and it is readily dispersed or suspended in organic materials. A suitable product is Kaophobe 45 produced by Georgia Kaolin Company, Elizabeth, N.J., which has a median particle diameter of 4.5 microns. Other suitable materials are described in the Bundy Pat. No. 3,080,256 and Canadian Pat. No. 706,791. Such organophilic kaolinites are compatible with organic materials of low and intermediate polarity, have rapid cooling (solidification) rates and they can be used to load the microcrystalline wax to a high degree before the viscosity becomes unduly high. Moreover, the final product has no tendency to separate as is the case with ordinary kaolinite which tends to settle out on standing.

A composition containing four parts of Kaophobe 45 to three parts of microcrystalline wax is a product of proper hardness for a masking composition but the flexibility is not all that is desired. It has been found that by substituting small quantities of plasticizing agents, such as ethylene-vinyl acetate (EVA) copolymers and pentaerythritol esters, in relatively small quantities (1–10% by weight), for part of the microcrystalline wax, proper flexibility and hardness of the masking compositions are obtained and proper cooling (solidification) rates are retained. EVA copolymers having viscosities of 15,000 to 50,000 poise at 300° F. are preferred. Suitable EVA copolymers are available from U.S.I. Chemicals, National Distillers & Chemical Corporation, New York, N.Y. as Ultrathene UE 631, 633 and 634. Preferred pentaerythritol esters are those of fatty acids containing 12–20 carbon atoms and of rosin acids such as abietic, dihydroabietic and tetrahydroabietic acids.

The compositions of microcrystalline wax and surface-modified kaolinite when blended with EVA copolymer, with paraffin wax and/or with pentaerythritol higher esters produce viscous materials which adhere well to metal stock, are flexible yet hard, and which cool rapidly to form a hard surface on the stock, without becoming brittle. The thixotropic properties are such that the masking agent can be applied with tolerances as close as 0.01 inch in a continuous extrusion coating process.

The wax-kaolinite (organophilic) preparations described herein do not interfere with metal plating or anodizing processes. The surface-modified kaolinite does not tend to settle out of the wax suspension or cling to the metal stock after the wax is removed. The preparations do not flake off the metal when bumped and the high softening point (150° F. or higher) prevents blocking or smearing even at high temperature operations.

The invention is disclosed in further detail by means of the following examples which are provided for purposes of illustration only. It will be apparent to those skilled in the art that modifications in quantities of materials and operating conditions and the use of equivalent materials can be made without departing from the invention as disclosed herein.

Example 1

Ten pounds of modified petroleum wax (40% paraffin wax, 30% microcrystalline wax, 15% ethylene-vinyl acetate copolymer and 15% pentaerythritol tetraabietate, sold commercially as Shellpax 442 of Shell Oil Company), 20 lbs. of refined microcrystalline wax (e.g., Shellmax 400 of Shell Oil Company) and 40 lbs. of organophilic kaolinite (e.g., Kaophobe 45 of Georgia Kaolin Company) were thoroughly blended at 210–240° F. for 24 hours. The product was a smooth blend with a specific gravity of 1.34 at 190° F.

This masking composition was used in continuous-strip selective gold-plating of Phosphor-bronze or nickel-silver strip. The masking composition was applied by an extrusion process on one side of the stock, leaving an unmasked strip on which gold was later plated, and by a roll-on process on the other side of the stock. In this operation the stock was drawn over an extrusion plate which was located on top of a sump containing the molten masking composition and the latter was continuously supplied to the extrusion plate by a gear pump. The roller which coated the other side of the stock was located above the extrusion plate and was supplied with masking composition pumped from the sump.

The masking composition was sufficiently thixotropic that when extruded it maintained its dimensions on the stock, stayed in place and did not drip off the stock, thus providing an accurate unmasked strip for plating. It cooled and solidified rapidly so that the stock could be coiled immediately after application without blocking or smearing.

This composition has also been found useful as an anodizing resist for tantalum in the manufacture of tantalum thin-film capacitors. By way of example, areas which were not to be anodized were masked by applying the hot (190° F.) composition with a stainless steel screen, then heating the coated substrate to remelt the composition and finally cooling the product to produce a nonporous film which prevents anodization of the underlying metal. These operations can be carried out in equipment shown in the Reed Pat. Nos. 2,895,412, July 21, 1959 and 3,150,583, Sept. 29, 1964. After anodization the masking composition was removed by a boiling chlorinated organic liquid, such as trichloroethylene or perchloroethylene, and the anodized metal cleaned with a hot aqueous detergent solution.

Example 2

A masking composition was produced from the following ingredients:

| | Lbs. |
|---|---|
| Paraffin wax, M.P. 142° F. (Shellwax 200) | 15 |
| Paraffin wax, M.P. 159° F. (Shellwax 300) | 5 |
| Microcrystalline wax, M.P. 177° F. (Shellmax 400) | 115 |
| Ethylene-vinyl acetate copolymer, melt index 20 (Ultrathene UE 633) | 7.5 |
| Pentaerythritol tetraabietate | 7.5 |
| Organophilic kaolinite (Kaophobe 45) | 200 |

This formulation, when applied to strip stock at 190° F., cooled in 40 seconds to a nonsmearing, nonblocking, tough solid which was flexible enough that the strip stock could be immediately coiled without impairing the masking agent. It had excellent dielectric properties equivalent to those of Apiezon grease.

We claim:
1. A masking composition for metal surfaces comprising 30–45% high-melting microcrystalline wax, 45–68% orgaophilic kaolinite, and 1–10% ethylene-vinyl acetate copolymer and pentaerythritol fatty or rosin acid ester.

2. A masking composition as defined by claim 1 wherein the microcrystalline wax melts between 150° F. and 200° F.

3. A masking composition as defined by claim 2 wherein the ethylene-vinyl acetate copolymer has a viscosity of from 15,000 to 50,000 poise at 300° F.

4. A masking composition as defined by claim 3 wherein the pentaerythritol ester is pentaerythritol tetraabietate.

5. A masking composition as defined by claim 4 wherein the organophilic kaolinite is a combination of kaolinite, an organic polyamine and a fatty acid.

6. A masking composition as defined by claim 5 wherein the organophilic kaolinite is a kaolinite-ethylene-diamine-oleic acid combination.

7. A masking composition consisting essentially of 5–10% paraffin wax, 30–35% high melting microcrystalline wax, 55–60% organophilic kaolinite-ethylenediamine-oleic acid combination, and 2–7% ethylene-vinyl acetate copolymer and pentaerythritol tetraabietate.

8. The masking composition of claim 7 wherein the ethylene-vinyl acetate copolymer and the pentaerythritol tetraabietate are present in substantially equal quantities.

References Cited

UNITED STATES PATENTS

| 3,489,705 | 1/1970 | Zmitrovis et al. | 260—28.5 |
| 3,518,215 | 6/1970 | Apikos | 260—28.5 |

DONALD E. CZAJA, Primary Examiner

R. W. GRIFFIN, Assistant Examiner

U.C. Cl. X.R.

117—5.5, 161 R; 260—27 EV, 28.5, 41 R